Figure 1:
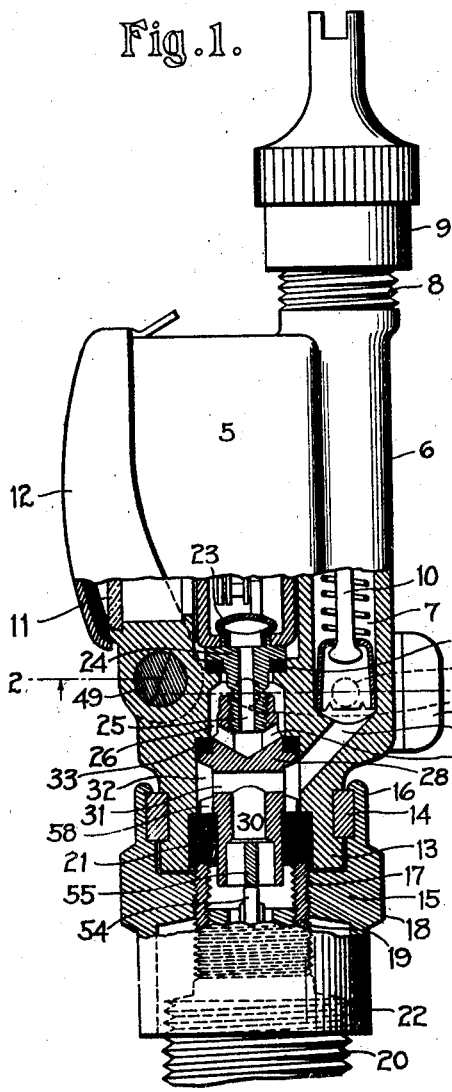

E. S. SAVAGE.
PRESSURE GAGE.
APPLICATION FILED SEPT. 24, 1913.

1,114,050.

Patented Oct. 20, 1914.

Witnesses:
C. W. Carroll
D. Gurnee

Inventor:
Edward S. Savage
by his attorneys
Davis & Dorsey

UNITED STATES PATENT OFFICE.

EDWARD S. SAVAGE, OF ROCHESTER, NEW YORK.

PRESSURE-GAGE.

1,114,050.

Specification of Letters Patent. Patented Oct. 20, 1914.

Application filed September 24, 1913. Serial No. 791,644.

*To all whom it may concern:*

Be it known that I, EDWARD S. SAVAGE, a citizen of the United States, and resident of Rochester, in the county of Monroe and State of New York, have invented certain new and useful Improvements in Pressure-Gages, of which the following is a specification.

One object of this invention is to provide a pressure-gage with simple and convenient means for protecting it against injury which may arise from the constant subjection of its pressure-indicating devices to fluid-pressure, particularly where the gage is simultaneously subjected to the effects of vibration.

In connection with motor-vehicles it is common to employ gages to indicate the pressure of air or other fluids, and a gage for this purpose has usually a pressure-controlled member in the form of a Bourdon tube or other resilient septum. I have found that where this septum is subjected for long periods to a high pressure, particularly in cases where the gage-mechanism is also subjected to vibration which causes oscillatory movements in the mechanism, the septum may eventually yield, to some extent, to the stresses to which it is subjected, so that the accuracy of the gage is impaired. I propose, accordingly, to protect the gage against this result by the use of means for relieving the Bourdon tube or equivalent part of the gage normally from pressure, the pressure being introduced to the tube only when an indication is required, and accordingly a feature of the invention resides in valve-mechanism associated with the other parts of the gage, whereby this may be accomplished.

A further feature of the invention resides in simple and convenient means for actuating the valve employed for the foregoing purpose, these means comprising a cover which normally covers the dial of the gage, but which is so connected with the relief-valve that the valve is actuated by the opening and closing movements of the cover, so as to throw the gage-mechanism into or out of operation when the cover is opened or closed, respectively.

While the invention, in its broadest aspect, is applicable to gages employed for various purposes, I have found it particularly useful in connection with a pressure-gage of the type adapted to be permanently mounted upon the wheel of a motor-vehicle, and permanently connected with the pneumatic tire thereon, so as to afford an indication, whenever required, of the air-pressure in the tire; and other features of the invention, which will be hereinafter set forth, relate to various details of construction applicable particularly to a pressure-gage for this specific purpose.

Figure 2:
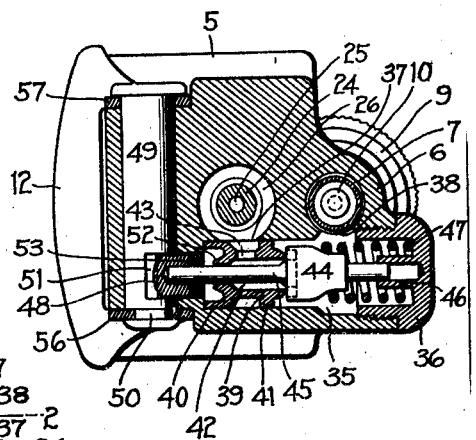

In the accompanying drawings:—Figure 1 is a side-elevation of a pressure-gage embodying the present invention, with the lower part of the gage shown in vertical median section, the figure showing also a portion of the inflating-nipple of a tire with which the gage is connected; and Fig. 2 is a section on the line 2—2 in Fig. 1, looking upwardly.

The invention is illustrated as embodied in a pressure-gage of the type adapted for permanent connection with a pneumatic tire, and as the general construction and arrangement of its parts are disclosed in my co-pending applications, Serial No. 622,785, filed April 22, 1911, and Serial No. 733,013 filed Nov. 22, 1912, they are not claimed or particularly described in the present application.

The illustrated pressure-gage has a casing comprising a substantially cylindrical body-portion 5, which incloses the Bourdon tube and the other parts of the gage-mechanism proper, and a vertical rear-portion or extension 6, provided with a longitudinal air-inlet passage 7 through which air may be introduced to inflate the tire with which the gage is connected. The part 6 terminates in an upwardly-extending screw-threaded nipple 8 adapted to receive an air-pump connection, this nipple being normally closed by a removable cap 9. A check-valve may be located within the passage 7 of this valve, and as this check-valve may be of any ordinary form it is not particularly illustrated, though the lower end of the valve-stem 10 appears in Fig. 1. The front of the body 5 of the casing is closed in the usual manner by a crystal 11, through which the indicating-mechanism of the gage may be viewed, and this crystal is normally covered and protected by a cover 12 which closes against the front of the casing.

To secure the gage upon the tire-nipple and connect it pneumatically with the tire, the casing has a downward projection or neck 13, having an annular groove in which a connecting-ring 14 is seated. A rotatable nut 15 has an upper extension 16 which loosely embraces the ring 14, and is flanged over the upper edge thereof, as shown in Fig. 1. This nut has an intermediate portion provided with internal screw-threads 17, the outer surface of this portion being squared at 18 in the usual manner, to provide for the reception of a wrench by which the nut may be screwed upon the tire-nipple. Fig. 1 shows the upper end of a tire-nipple of ordinary form, comprising an upper extremity 19 of smaller diameter, and a body-portion 20 of larger diameter. The part 19 has external screw-threads which are engaged by the threads 17 in the nut 15, and the upper end of the part 19 is seated against a suitable packing 21 within the neck 13, so that when the nut is screwed down hard upon the nipple an air-tight joint is formed between the nipple and the casing. For the sake of a finished appearance, and also to support the gage more firmly upon the nipple, the nut 15 has a cylindrical downward extension 22, which extends to, and preferably somewhat beyond, the upper end of the part 20 of the nipple, as shown in Fig. 1.

The pressure-indicating mechanism of the gage is not illustrated and described, as it may be of any ordinary or suitable form, but Fig. 1 illustrates the lower portion of a Bourdon tube 23 by which this mechanism is actuated. This tube is fixed to a nipple 24, which supports the tube and which also has a longitudinal air-passage 25 through which air may pass to or from the Bourdon tube. The nipple extends downwardly into an upper air-passage 26 in the neck of the casing, and it is provided with a flange which rests upon a packing-ring 27 seated in the casing. The nipple is secured in place by means of a coupling-member 28, this member having a screw-threaded aperture in its upper end which engages the screw-threaded lower end of the nipple. Transverse passages 29 in the coupling-member afford communication between the air-passages 25 and 26, but the middle portion of the coupling-member is solid so as to afford a closure against the vertical passage of air.

The coupling-member 28 is provided, in its lower portion, with a second vertical air-passage 30 which communicates, by means of a transverse passage 31, with a lower air-passage 32 in the neck 13 of the casing. The coupling-member is also provided with an annular flange seated against a packing-ring 33, which rests upon a shoulder at the junction between the air passages 26 and 32. A second flange 58 Fig. 2 upon the coupling-member serves as a partial support for the packing 21, and this flange may also be suitably recessed or formed to receive a wrench by which the coupling-member is screwed into place. The connection between the coupling-member and the nipple 24 serves to draw both of these parts tightly against the packing rings 27 and 33, thus securing the parts in place and producing effective air-seals between the various recesses and passages in the casing.

The inlet-passage 7 is connected with the passage 32 by a passage 34, and when air is introduced to inflate the tire it passes downwardly through the passages 7, 34 and 32, and thence, through the passages 31 and 30, to the tire-nipple, through which it is introduced in the ordinary manner to the tire. To admit air from the tire to the Bourdon tube 23 the casing is provided with a horizontal valve-chamber 35, which is closed at its rear end by a screw-plug 36. The valve-chamber 35 intersects the passage 26, as shown in Fig. 2, so as to provide an opening 37 through which air may pass. The valve-chamber also communicates with the air-inlet passage 7 through an opening 38. Accordingly, when the gage is in use air-pressure from the tire may be communicated to the Bourdon tube through the passages 30, 31, 32 and 34, thence through the opening 38 to the chamber 35, and thence, through the opening 37, to the passages 26, 29 and 25, from the last of which it enters the Bourdon tube.

The valve by which the Bourdon tube is normally relieved from air-pressure is located in the valve-chamber 35, and is illustrated particularly in Fig. 2. A valve-cage 39 of generally-cylindrical form is provided with two peripheral portions or flanges 40 and 41 of the same diameter as the valve-chamber, and formed to make a tight fit therein so that the valve-cage is retained frictionally in place, while the flanges constitute air-tight closures dividing the chamber. The valve-cage 39 has a central longitudinal air-passage 42, which communicates, through a transverse opening 43, with the annular space between the flanges 40 and 41. The right-hand end of the valve-cage forms a valve-seat which coöperates with an air-valve 44. This valve may be provided, as shown in dotted lines, with a washer of suitable packing-material to engage the valve-seat. The valve 44 is mounted on a valve-stem 45 of which the right-hand end is guided by a sleeve 46 integral with the cap 36. A stiff compression-spring 47 is seated against the valve and the cap, respectively, and tends to force the valve firmly into engagement with its seat.

The air-valve 44 is normally held closed by the spring 47, and it thus prevents air from flowing from the tire-nipple to the Bourdon tube through the valve-chamber as above described. In order that the valve 44 may be opened, to permit the gage to act when necessary, this valve is connected with the cover 12 by the following means: A head 48 is mounted loosely upon the left-hand end of the valve-stem 45 in position to coöperate with the pivot 49 upon which the cover 12 is mounted. This pivot is embraced, at its ends, by ears 56 and 57 on the cover, and it is provided, at one end, with flattened surfaces 50 to cause the pivot to be rotated when the cover is swung downwardly or upwardly. Opposite the head 48 the pivot is recessed to form a flat surface 51 adjacent the head. When the cover is in closed position the surface 51 is out of engagement with the head, as shown in Figs. 1 and 2, but when the cover is swung downwardly the lower extremity of the surface 51 engages the head in the manner of a cam and forces it rearwardly, thus compressing the spring 47 and moving the valve 44 from its seat, whereupon air may flow through the valve-chamber by way of the passages 42 and 43 in the valve-cage 39. When the cover is raised again to closed position the valve 44 is released and allowed to reseat itself. The compressed air remaining in the Bourdon tube is then immediately exhausted by leakage between the valve-stem 45 and the portion 52 of the cage through which it passes, since these parts make a loose joint at this point, and the air then escapes through the joint between the pivot 49 and the casing, which is also sufficiently loose for the purpose. The Bourdon tube is thus entirely relieved from pressure when the cover 12 is in closed position.

To prevent leakage of air under pressure from the left-hand end of the valve-cage 39 when the cover 12 is opened and the gage is in use, the part 52 of the cage is formed as a valve-seat and coöperates with a packing-ring 53 seated in the head 48. When the cover is fully open this ring is forced into engagement with the seat 52, thus effectually preventing leakage of air between the valve-stem 45 and the seat 52.

It will be understood that the tire-nipple is provided with the usual check-valve, but when the gage is fixed upon the tire-nipple it is necessary that this valve be held open, in order that the air-pressure may be freely communicated between the tire and the gage. In Fig. 1 I have illustrated the upper part of the stem 54 of the check-valve in question, and I have shown the coupling-member 28 as being provided with a transverse member 55 located in the lower part of the air-passage 30 and adapted to engage and depress the upper end of the valve-stem 54 when the gage is in position on the nipple, thus holding the check-valve constantly open.

The operation of the pressure gage as a whole is as follows: In its normal condition, as applied to a tire-nipple and with the cover closed, the tire-valve is held open, thus communicating the air-pressure in the tire to the passages 31, 32, 34 and 7, the escape of air being prevented, however, by the cap 9 on the inflating-nipple 8. At this time the valve 44 is seated, thus interrupting the communication between the Bourdon tube and the tire, and the valve-member 48 is held away from its seat, as in Fig. 2, so that air may escape freely from the Bourdon tube to the atmosphere, and relieve the tube from all pressure. Whenever the user desires to ascertain the air-pressure in the tire the cover may be swung open, and by so doing the valve-member 48 is moved to closed position, thus sealing the escape of air from the Bourdon tube, and at the same time the valve 44 is opened, throwing the tube into communication with the passages connected with the tire-nipple and admitting air to the Bourdon tube under the full pressure within the tire. When the cover is closed the air is again exhausted from the Bourdon tube. When the tire is to be inflated the cover of the gage is preferably open, so that the gage shows when the proper pressure has been attained, but if it be desired to avoid the effect upon the gage mechanism of the pulsatory operation of the air-pump, the cover may be closed during the pumping operation.

My invention is not limited to the embodiment thereof hereinbefore described and illustrated in the accompanying drawings, but it may be embodied in various other forms within the nature of the invention, as it is defined in the following claims.

I claim:—

1. In a pressure gage the combination, with pressure-indicating means, a casing inclosing said means, and a cover swingingly mounted on the casing; of a valve controlling the admission of pressure to the pressure-indicating means and operatively associated with the cover so as to be opened and closed by movement of the cover to open or closed position respectively.

2. A pressure-gage having, in combination, pressure-indicating means; a casing inclosing said means and provided with an air-inlet passage and a branch passage connecting the air-inlet passage with the pressure-indicating means; a check-valve controlling said branch-passage; a spring holding the check-valve normally closed; a manually-operable member pivotally mounted on the casing; and coöperating devices connected with said member and said valve whereby the valve is forced open, when the manually-operable member is swung in one direction, to admit pressure to the pressure-indicating means.

3. A pressure-gage having, in combination, a casing provided with a body-portion to receive pressure-indicating means, a neck adapted for connection with a tire-nipple, upper and lower air-passages in said neck, an air-inlet passage communicating with the lower air-passage, and a valve-chamber communicating with the upper air-passage and the air-inlet passage; pressure-indicating means, including a Bourdon tube, in the body-portion of the casing; coupling-means located in the upper and lower air-passages in the neck of the casing and securing the Bourdon tube in operative position, said means having a solid portion, forming a closure between said upper and lower air-passages, and a passage for connecting the Bourdon tube with the upper air-passage; a valve-cage provided with a valve-seat located in the valve-chamber between its points of communication with the upper air-passage and the air-inlet passage; a valve coöperating with the valve-seat; and manually-operable means, external to the casing, for controlling said valve.

EDWARD S. SAVAGE.

Witnesses:
FARNUM F. DORSEY,
D. GURNEE.

Copies of this patent may be obtained for five cents each, by addressing the "Commissioner of Patents. Washington, D. C."